United States Patent
Ioppolo et al.

(10) Patent No.: US 10,471,851 B2
(45) Date of Patent: Nov. 12, 2019

(54) SEAT CUSHION ARRANGEMENT COMPRISING A SEAT DEPTH ADJUSTMENT DEVICE

(71) Applicant: Brose Fahrzeugteile GmbH & Co. Kommanditgesellschaf, Coburg, Coburg (DE)

(72) Inventors: Leo Ioppolo, Washington Twp, MI (US); Dhiraj Kharche, Auburn Hills, MI (US)

(73) Assignee: BROSE FAHRZEUGTEILE GMBH & CO. KOMMANDITGESELLSCHAFT, COBURG, Coburg (DE)

( * ) Notice: Subject to any disclaimer, the term of this patent is extended or adjusted under 35 U.S.C. 154(b) by 0 days.

(21) Appl. No.: 15/802,763

(22) Filed: Nov. 3, 2017

(65) Prior Publication Data
US 2019/0135139 A1 May 9, 2019

(51) Int. Cl.
*B60N 2/02* (2006.01)

(52) U.S. Cl.
CPC .................................. *B60N 2/0284* (2013.01)

(58) Field of Classification Search
CPC .................................................. B60N 2/0284
USPC ....... 297/284.1, 284.3, 284.6, 284.8, 284.11, 297/311, 337, 340, 452.1, 452.33, 452.38, 297/452.4
See application file for complete search history.

(56) References Cited

U.S. PATENT DOCUMENTS

2009/0033134 A1 2/2009 Hofmann et al.
2013/0320730 A1* 12/2013 Aselage ............... B60N 2/0284
    297/337
2015/0352980 A1 12/2015 Rehfuss

FOREIGN PATENT DOCUMENTS

DE  10 2009 012 780 B3   7/2010
DE  20 2013 102 108 U1  10/2013
DE  10 2010 007 829 B4   3/2017

(Continued)

*Primary Examiner* — Justin V Lewis
(74) *Attorney, Agent, or Firm* — Lewis Roca Rothgerber Christie LLP

(57) ABSTRACT

The invention relates to a seat cushion arrangement comprising a first cushion member; a second cushion member being adjustable relative to the first cushion member; and a seat depth adjustment device for adjusting the second cushion member relative to the first cushion member along a longitudinal adjustment axis, wherein the seat depth adjustment device in particular comprises an adjustment member to which the second cushion member is fastened and which is adjustable between a foremost position and a rearmost position relative to a guiding member for adjusting the second cushion member relative to the first cushion member; a trim member connected to both the first and second cushion members, which trim member covers a gap between the first and second cushion members at least in the foremost position of the adjustment member and is at least partially retracted into the gap in the rearmost position of the adjustment member; and an elastic member (a) connected to the trim member and to at least one of the guiding member and a seat front part of the seat depth adjustment device and (b) configured to pull the trim member into the gap upon adjustment of the adjustment member from the foremost position towards the rearmost position.

20 Claims, 10 Drawing Sheets

(56) References Cited

FOREIGN PATENT DOCUMENTS

EP            1 984 206 B1    10/2008
WO    WO 2010/091662 A1     8/2010

* cited by examiner

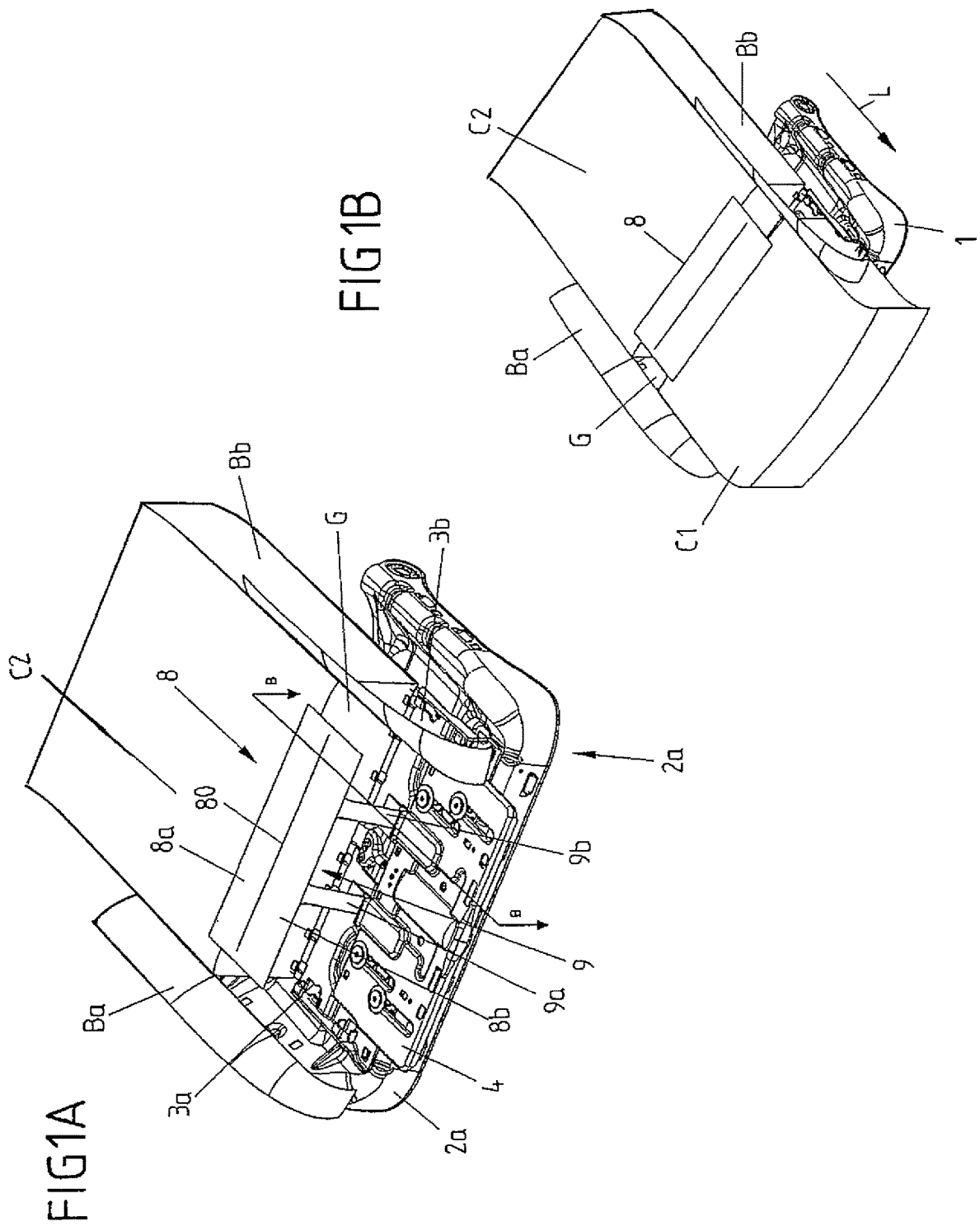

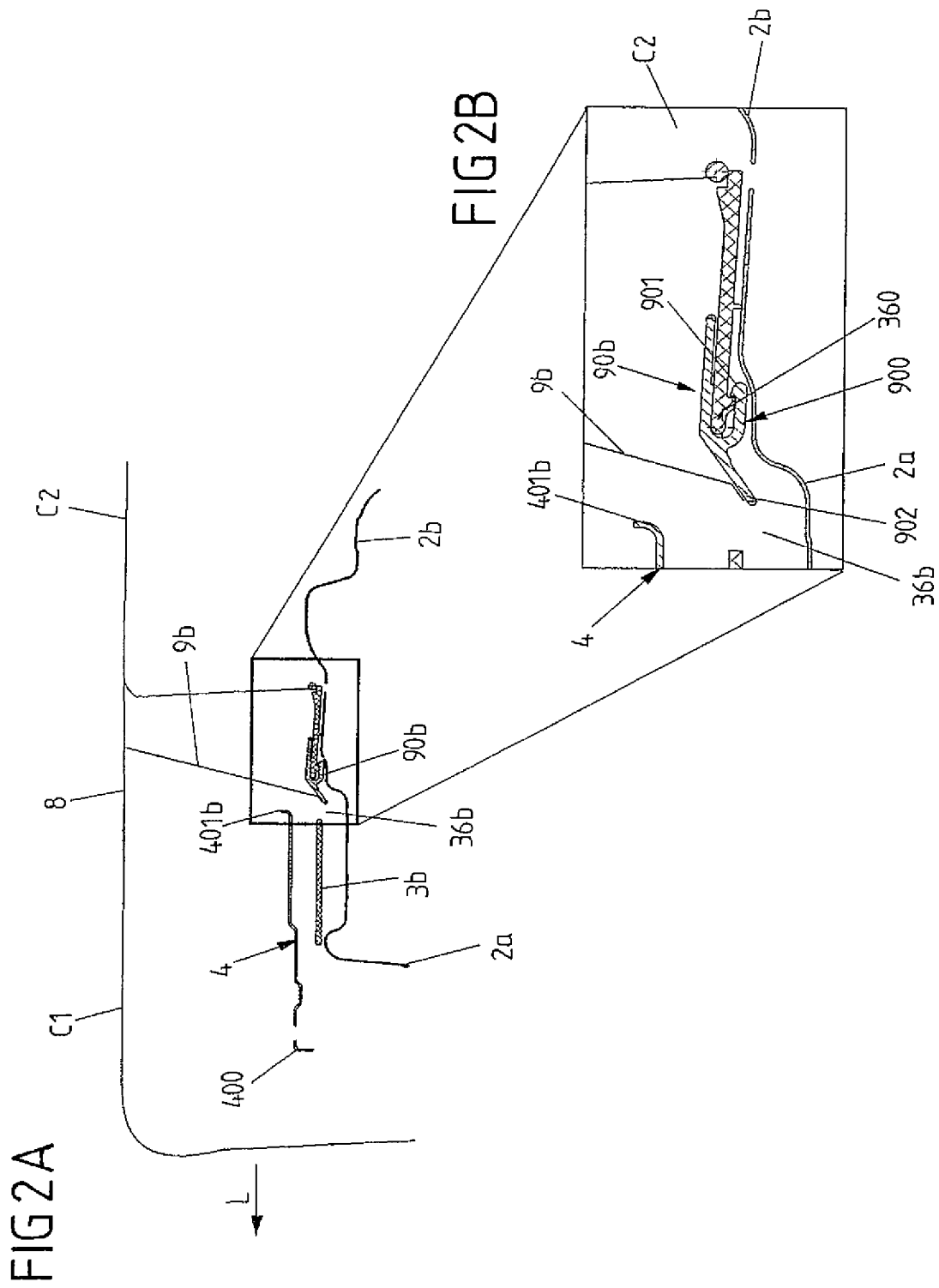

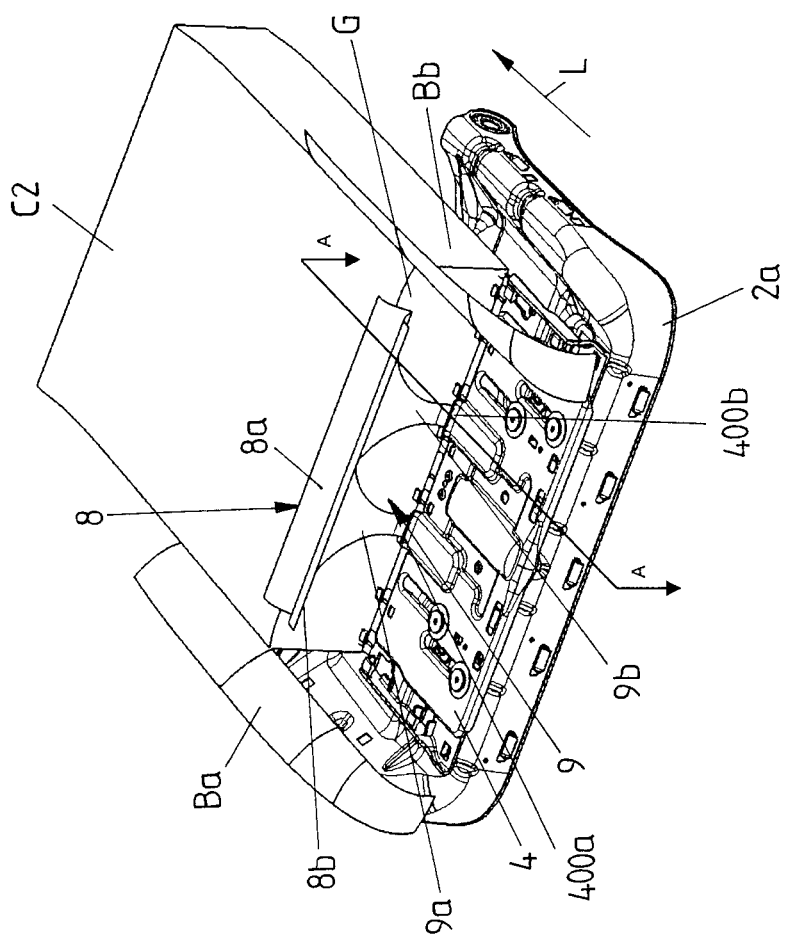

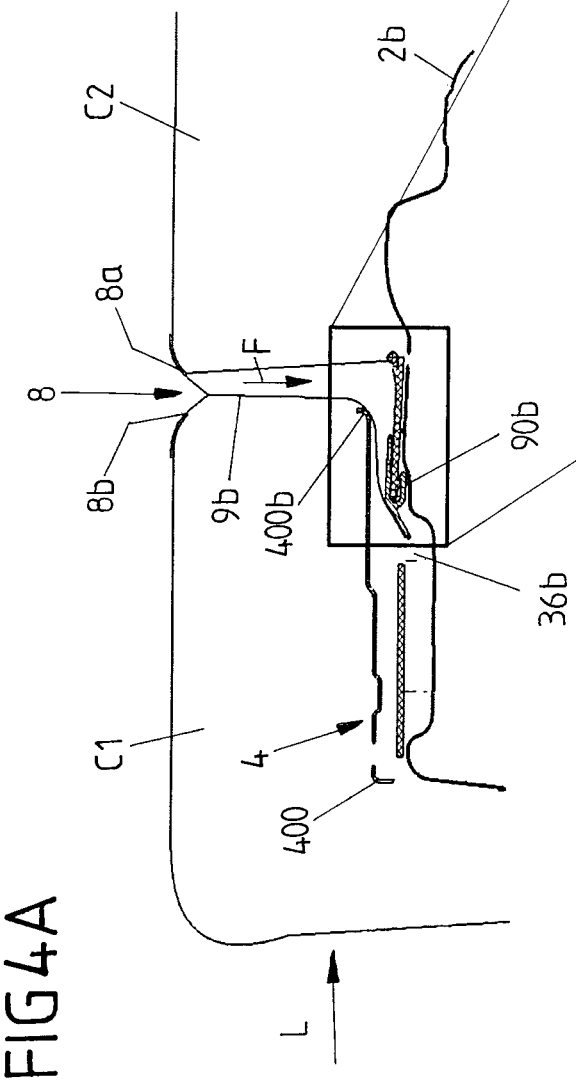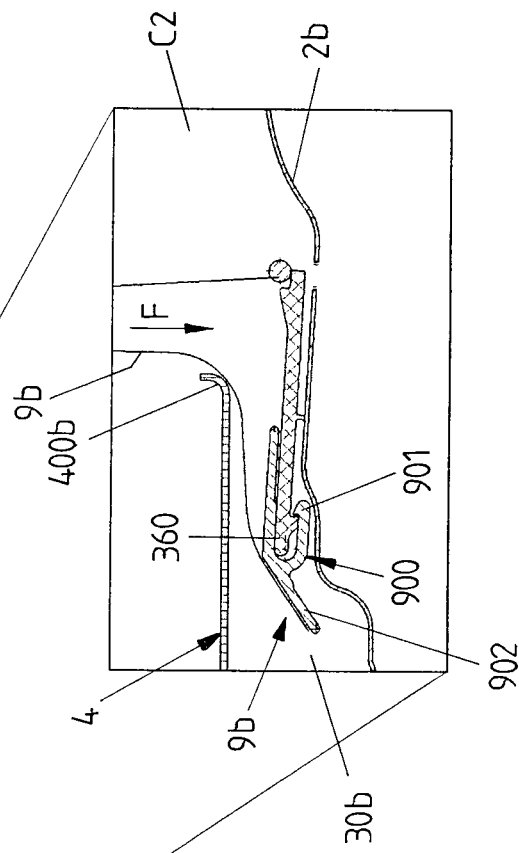

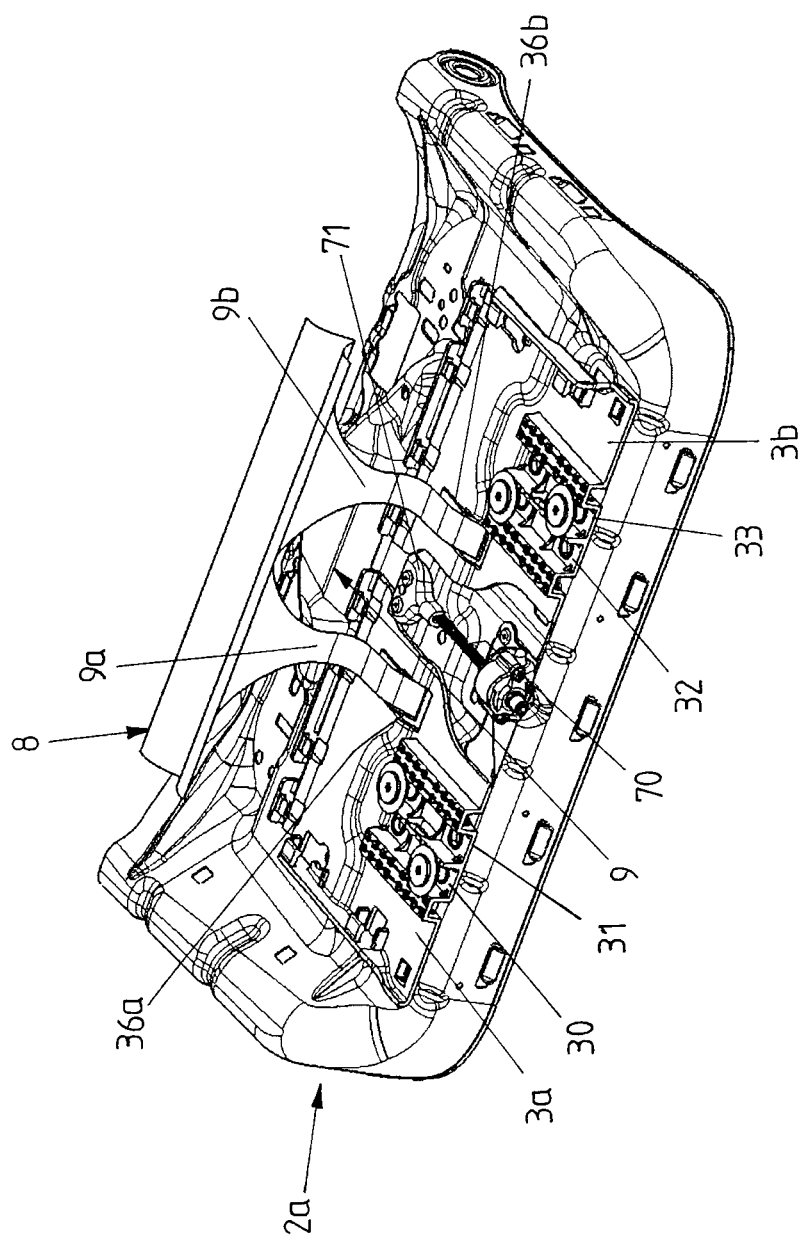

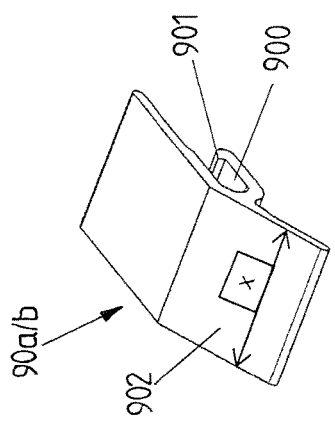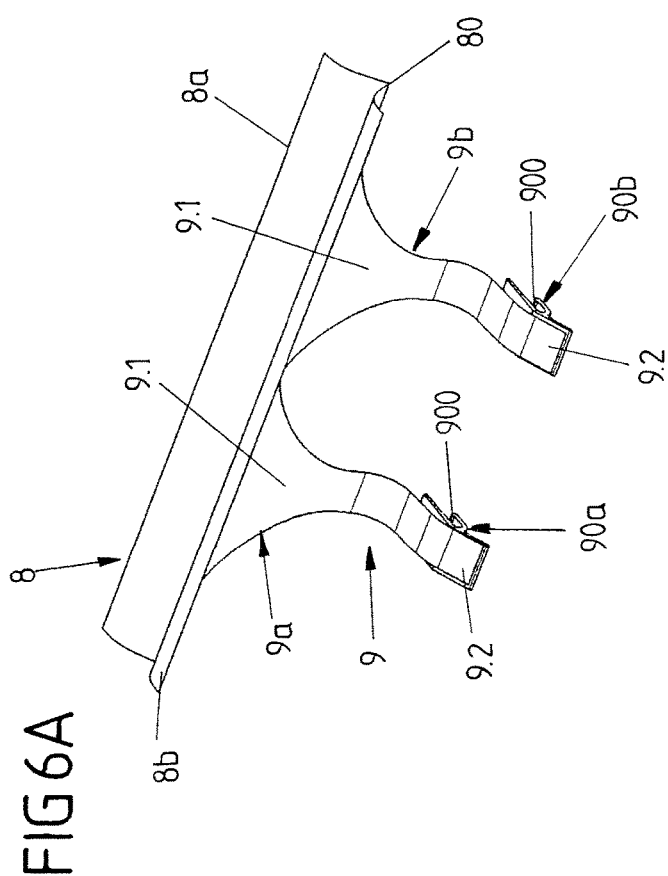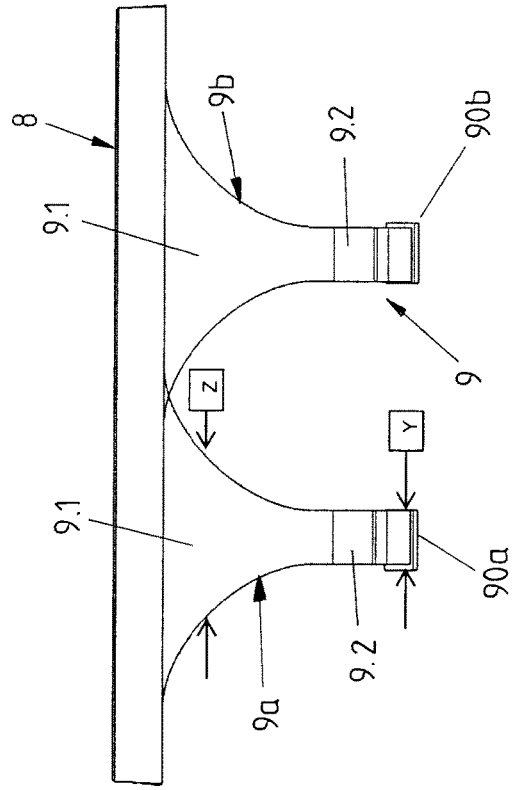

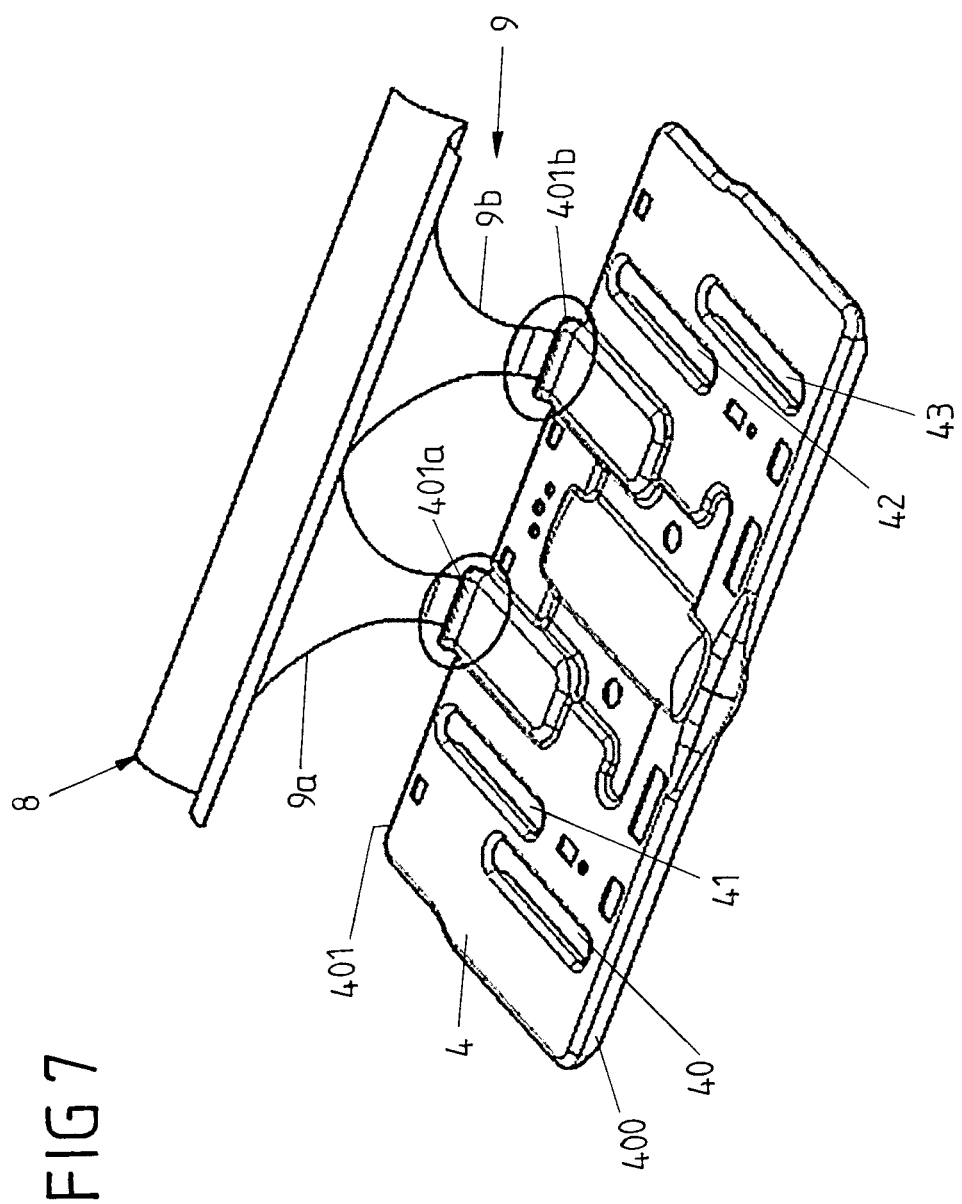

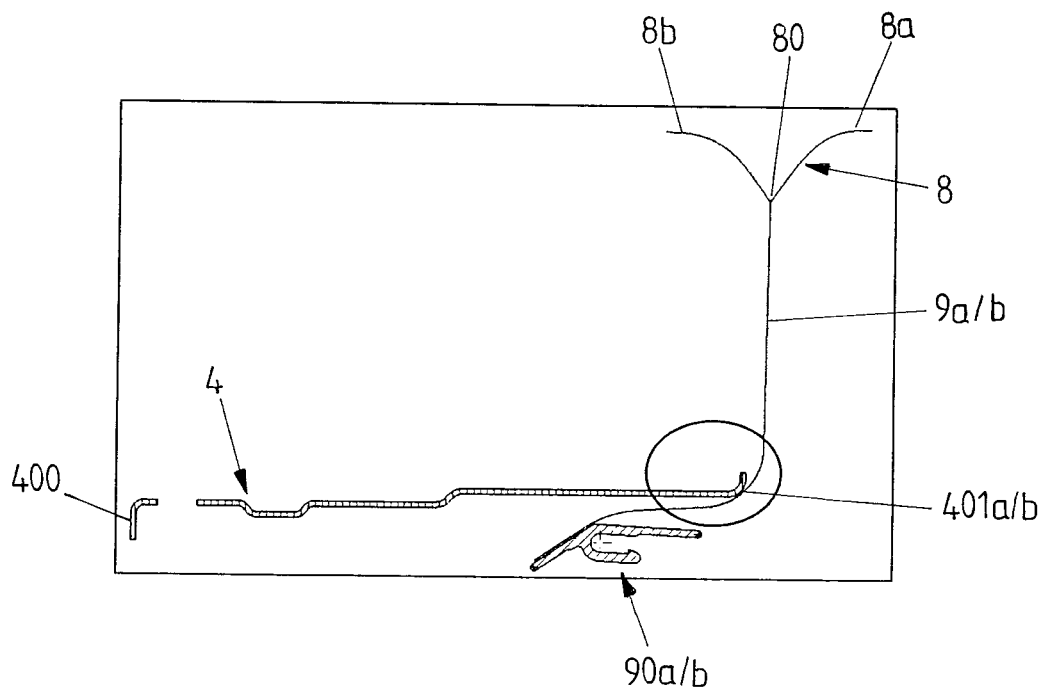
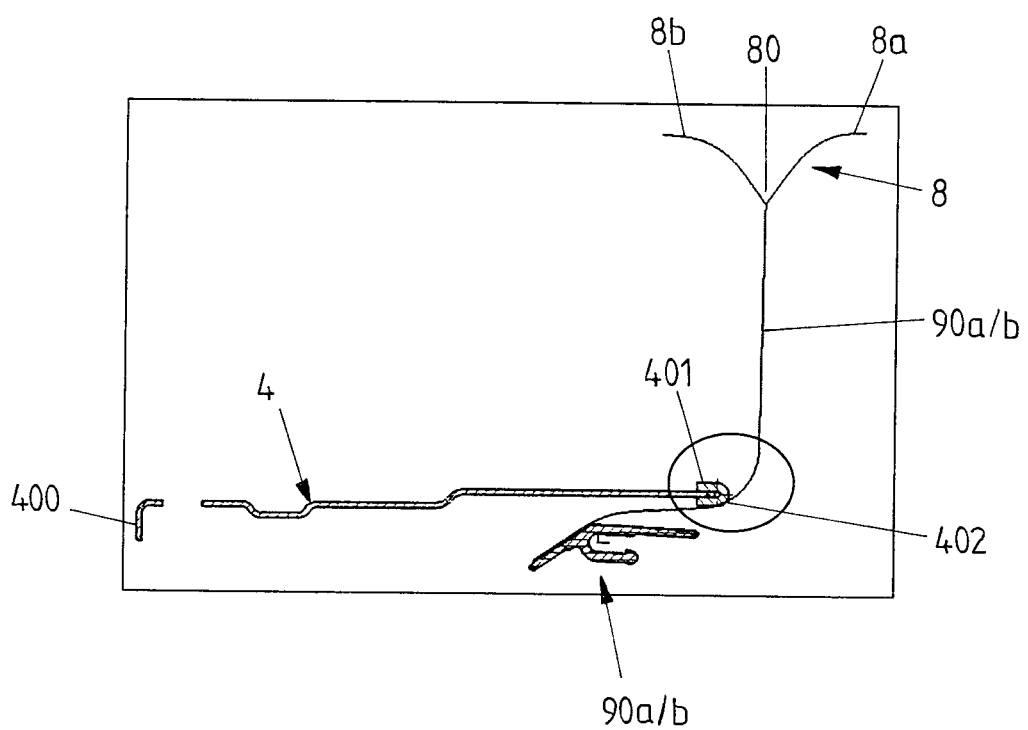

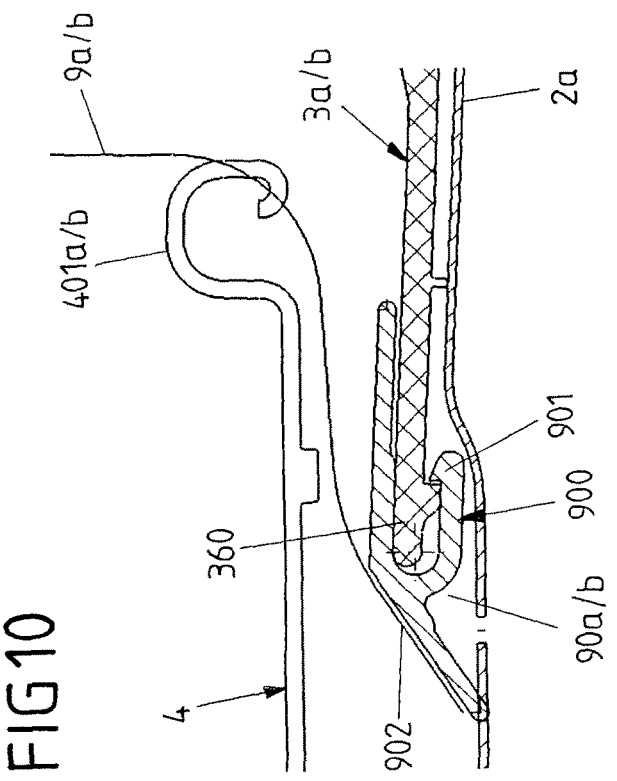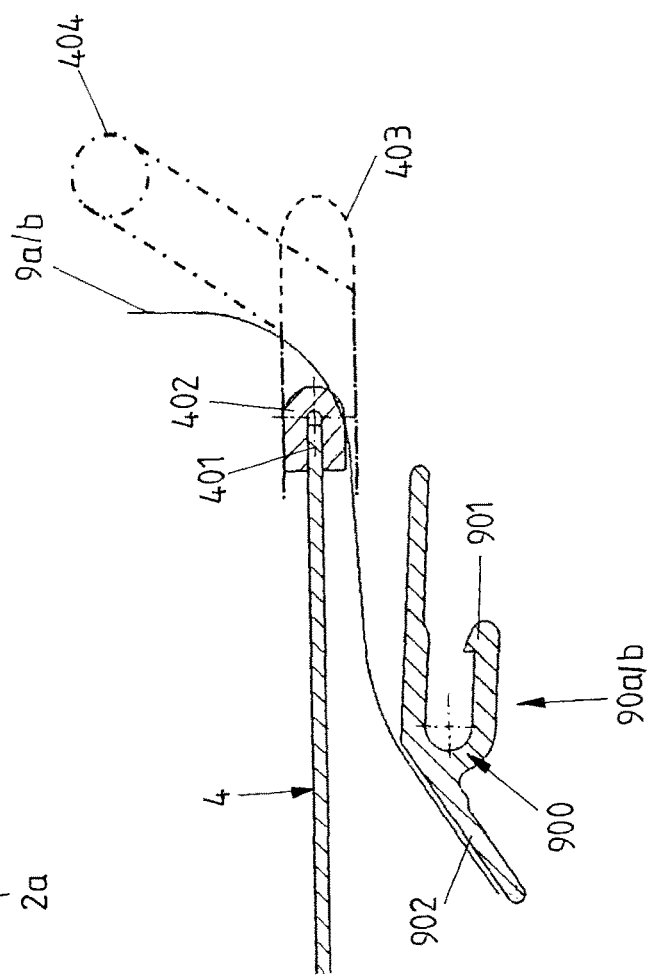

SEAT CUSHION ARRANGEMENT COMPRISING A SEAT DEPTH ADJUSTMENT DEVICE

FIELD

The present invention relates to a seat depth adjustment device.

BACKGROUND

Seat cushion arrangements comprising a (fixed) first cushion member, a (movable) second cushion member being adjustable relative to the first cushion member and a seat depth adjustment device for adjusting the second cushion member relative to the first cushion member along a longitudinal adjustment axis are typically implemented in motor vehicle seats. The seat depth adjustment device then allows for adjustment of the second cushion member being located at the front of the seat. For adjusting the second cushion member and thus the seat depth of the motor vehicle seat the seat depth adjustment device may comprise a seat front part, for example in the form of cushion pan, a guiding member at the seat front part as well as an adjustment member to which the second cushion member is fastened and which is adjustable between a foremost position and rearmost position relative to the guiding member for adjusting the second cushion member relative to the first cushion member. The guiding member can be integrally formed with the seat front part or may be a separate component fixed to the seat front part. As for example disclosed in EP 1 984 206 B1 the adjustment member may be mounted to the guiding member and may slide along the guiding member driven by an electric drive motor of the seat depth adjustment device.

As for example disclosed in DE 10 2010 007 829 B4 the seat depth adjustment device may further comprise a flexible and/or textile trim member connected to both the first and second cushion members and covering a gap between the first and second cushion member at least in the foremost position of the adjustment member. The trim member thus covers the gap between the fixed first cushion member and the displaceable second cushion member. In the rearmost position of the adjustment member the trim member is at least partially retracted in the gap and thus mostly hidden from view.

For the adjustment of the trim member upon movement of the second cushion member relative to the first cushion member DE 10 2010 007 829 B4 proposes providing the seat depth adjustment device with an elastic member which is connected to the trim member and to the seat front part. The elastic member is configured to pull the trim member into the gap upon adjustment of the adjustment member from the foremost position towards the rearmost position. For pulling the trim member into the gap by means of the elastic member a rearmost portion of the adjustment member may act on the elastic member between two end sections of the elastic member at which two end sections the elastic member is connected to the trim member and the seat front part. Upon adjustment of the adjustment member from the foremost position towards the rearmost position the rearmost portion of the adjustment member acts on the elastic member thereby deflecting or bending the elastic member so that a tensile force is applied to the trim member for at least partially retracting the trim member into the gap. For connecting the elastic member to the seat front part DE 10 2010 007 829 B 4proposes using bolts.

In US 2015/0352980 B1 a seat depth adjustment device is disclosed in which a strap-like inelastic member is connected to the trim member. Furthermore, an additional elastic member in the form of a spring is provided which is connected to the inelastic member and to the seat front part.

The prior art seat cushion arrangements are rather complex, difficult to assemble and requiring rather much space at a seat structure to which the cushion arrangement is to be mounted.

SUMMARY

A seat cushion arrangement is proposed which comprises a first cushion member, a second cushion member being adjustable relative to the first cushion member and a seat depth adjustment device for adjusting the second cushion member relative to the first cushion member along a longitudinal adjustment axis. The seat cushion arrangement further comprises a seat depth adjustment device comprising a seat front part, a guiding member at the seat front part (being integrally formed with the seat front part or being a separate component mounted to the seat front part), and an adjustment member to which the second cushion member is fastened and which is adjustable between a foremost position and a rearmost position relative to the guiding member for adjusting the second cushion member relative to the first cushion member. The seat depth adjustment device further comprises a trim member connected to both the first and second cushion members, which trim member covers a gap between the first and second cushion members at least in the foremost position of the adjustment member and which trim member is at least partially retracted into the gap in the rearmost position of the adjustment member (or, in other words, which trim member is configured to cover the gap between the first and second cushion members at least in the foremost position of the adjustment member and which trim member is configured to be at least partially retracted into the gap in the rearmost position of the adjustment member). The seat depth adjustment device further comprises an elastic member which (a) is (directly or indirectly) connected to the trim member and to at least one of the guiding member and the seat front part and (b) is a configured to pull the trim member into the gap upon adjustment of the adjustment member from the foremost position towards the rearmost position, wherein the elastic member comprises at least one end section fixed to an attachment member engaging an edge section of at least one of the guiding member and the seat front part thereby connecting the elastic member to at least one of the guiding member and the seat front part. The attachment member to which at least one end section of the elastic member is fixed engages around (or grips) an edge section of at least one of the guiding member and the seat front part thus allowing for an improved connection of the elastic member and a faster and less complex assembly for the seat depth adjustment device.

The elastic member may extend from at least one of the guiding member and the seat front part to the trim member in order to apply a tensile force on the trim member (for displacing the trim member into a retracted position) upon adjustment of the adjustment member. Generally, the attachment part may be made of plastic.

In one embodiment, the attachment member comprises an engagement part clipped to (or hooked on) the edge section. The attachment part may thus comprise a clip portion for clipping or hooking the attachment member to/on the edge section. Clipping or hooking without requiring a tool for fixation may further facilitate the assembly of the attachment member and thus of the elastic member to at least one of the guiding member and the seat front part.

The attachment member may comprise a locking catch portion engaging behind a projection at the edge section. The locking catch portion may, for example, be bent elastically upon attaching the attachment member. The locking catch portion may thus be snapped onto the edge section and being locked in place when the attachment member is duly mounted to the edge section. The elastic member may thus be clipped and fastened and to at least one of the guiding member and the seat front part via the attachment member in just one assembly step.

In one embodiment, the edge section borders an opening into which the attachment member reaches. The attachment member may, for example, be mounted to at least one of the guiding member and the seat front part at an opening provided in at least one of the guiding member and the seat front part. For example, the attachment member may engage around an edge section of the guiding member bordering an opening in the guiding member. In one embodiment, the opening in the guiding member may furthermore completely covered by the adjustment member in the rearmost position of the adjustment member thereby allowing for a compact design of the seat depth adjustment device. In such an embodiment the attachment member may be arranged underneath the adjustment member at least in the rearmost position of the adjustment member. The elastic member extending between the attachment part and the trim member may that at least partially extend underneath the adjustment member and thus for example in a spacing provided between the attachment member and at least one of the guiding member and the seat front part.

In one embodiment, the end section of the elastic member may be sewed or bonded to the attachment member.

In one embodiment, the adjustment member may be adjustable from the rearmost position to the foremost position in a first direction along the longitudinal adjustment axis and may be adjustable from the foremost position to the rearmost position in a second direction opposite the first direction. In one alternative the edge section the attachment member engages lies towards the first direction. For example, the guide member or seat front part may comprise a rear end in the second direction and the edge section the attachment member engages is spaced apart from this rear end in the first direction. The connection thereby provided by the attachment part may be less prone to a detachment upon a force applied to the elastic member for pulling the trim member into the gap and being at least partially directed in the second direction.

In one embodiment, at least one of a flange portion and a cover element is provided at the seat depth adjustment device which flange portion or cover element is configured to act on the elastic member upon adjustment of the adjustment member from the foremost position towards the rearmost position for tensioning the elastic member and thereby pulling the trim member into the gap. At least one of the flange portion and the cover element is thus provided for tensioning the elastic member and inducing the tensile force for pulling the trim member into the gap. At least one of the flange portion and the cover element may be provided at the adjustment member, in particular at a rear end of the adjustment member. The elastic member may for example be deflected at at least one of the flange portion and the cover element at least in the rearmost position of the adjustment member. The elastic member extending from the attachment member to the trim member may thus be deflected at at least one of the flange portion and the cover element when the adjustment member is located in its rearmost position in which the trim member should be maximally retracted. For this purpose, at least one of the flange portion and the cover element may comprise a curved portion for interacting with the elastic member. For example, a convex portion for interacting with the elastic member may be provided. The curved, in particular convex portion of at least one of the flange portion and the cover element may be formed integrally with the flange portion or the cover element, respectively.

In one embodiment, the flange portion may be an integral part of the adjustment member. For example, the flange portion may be formed by the adjustment member. In one embodiment the flange portion is provided at a rear end of the adjustment member.

In one embodiment, the cover element is a separate component plugged onto an rear edge section of the adjustment member.

In one embodiment, the elastic member comprises at least one strap portion and at least one of the flange portion and the cover element is configured to act on the at least one strap portion of the elastic member upon adjustment of the adjustment member from the foremost position towards the rearmost position. At least one of the flange portion and the cover element is configured to act on the at least one elongated strap portion of the elastic member in order to apply a tensile force on the trim member via the elastic member. The at least one strip portion may comprise the end section of the elastic member fixed to the attachment member.

In one embodiment, the elastic member comprises at least one strap portion which comprises the end section fixed to the attachment member and another end section connected to the trim member, wherein a width of at least one section of the at least one strap portion increases along a direction of extension of the least one strap portion pointing from the (first) end section fixed to the attachment member towards the other (second) end section connected to the trim member. The other (second) end section connected to the trim member is thus located remote from the (first) end section fixed to the attachment member. The at least one strap portion widens towards the (second) end section connected to the trim member. This may allow for an improved retraction of the trim member extending along a substantial width of the seat cushion into the gap.

The at least one section of increasing width may have a constant thickness. In addition or in the alternative the at least one strap portion may comprise a (first) end section fixed to the attachment member having (viewed from the front) a rectangular contour and a (second) end section of greater width which is connected to the trim member and which has (again viewed from the front) a triangular contour.

In one embodiment, the elastic member comprises at least two strap portions being spaced apart from each other in a direction perpendicular to the longitudinal adjustment axis of the seat depth adjustment device. Each strip portion may be fixed to one of at least two attachment members. Further, each strip portion may have a first end section fixed to the attachment member having a rectangular contour and may have a second end section of greater width with a triangular contour. In such an embodiment the second end sections of triangular contour may be adjacently connected to the trim member. In one embodiment, the adjacent second end sections are configured to apply a tensile force on the trim member on two different longitudinal halves of the trim member.

According to another aspect, a seat cushion arrangement is proposed which comprises a first cushion member, a second cushion member being adjustable relative to the first cushion member and a seat depth adjustment device for adjusting the second cushion member relative to the first cushion member along a longitudinal adjustment axis. The seat depth adjustment device comprises a seat front part, a guiding member at the seat front part and an adjustment member to which the second cushion member is fastened and which is adjustable between a foremost position and a rearmost position relative to the guiding member for adjusting the second cushion member relative to the first cushion member. The seat cushion arrangement further comprises a trim member connected to both the first and second cushion members. The trim member covers the gap between the first and second cushion members at least in the foremost position of the adjustment member and is at least partially retracted into the gap in the rearmost position of the adjustment member. An elastic member of the seat depth adjustment device is connected to the trim member and to at least one of the guiding member and the seat front part. The elastic member is further configured to pull the trim member into the gap upon adjustment of the adjustment member from the foremost position towards the rearmost position, wherein the elastic member comprises at least one strap portion comprising a first end section via which the elastic member is (directly or indirectly) connected to at least one of the guiding member and the seat front part and a second end section via which the elastic member is (directly or indirectly) connected to the trim member. The at least one strap portion extends along a direction of extension from the first end section towards the second end section and comprises at least one section at which a width of the at least one strap portion increases along the direction of extension.

The at least one section of increasing width may have a constant thickness.

In one embodiment, the elastic member may comprise at least two strap portions being spaced apart from each other in a direction perpendicular to the longitudinal adjustment axis.

In one embodiment, according to the second aspect the first end section may be fixed to an attachment member for connecting the elastic member to at least one of the guide member and the seat front part.

In one embodiment, the first end section may have a rectangular contour, whereas the second end section of greater width may have a triangular contour.

A seat cushion arrangement according to the first aspect may obviously be combined with a seat cushion arrangement according to the second aspect. Accordingly, features mentioned above with respect to an embodiment of a seat cushion arrangement according to the first aspect may also be implemented in an embodiment of a seat cushion arrangement according to the second aspect and vice versa.

BRIEF DESCRIPTION OF THE DRAWINGS

The previously mentioned and other advantages of the present solution will be apparent to those skilled in the art upon consideration of the following specification and the attached drawings.

FIG. 1A is a perspective view on a seat cushion arrangement with an adjustment member of a seat depth adjustment device in a foremost position and a trim member covering a gap between first and second cushion members of a motor vehicle seat (the first cushion member but not being shown in FIG. 1A).

FIG. 1B is a perspective view on the seat arrangement of FIG. 1A showing the first cushion member at the seat front in the foremost position.

FIG. 2A is a cross-sectional view of the seat arrangement taken along the line B-B of FIG. 1A.

FIG. 2B is an enlarged view of a detail of FIG. 2A.

FIG. 3 is a perspective view of the seat arrangement with the adjustment member in a rearmost position in which the trim member is at least partially retracted into the gap between the first and second cushion members.

FIG. 4A is a cross-sectional view taken along the line A-A of FIG. 3.

FIG. 4B is an enlarged view of a detail of FIG. 4A.

FIG. 5 is a perspective view on the seat depth adjustment device of the seat cushion arrangement without the adjustment member.

FIG. 6A is a perspective view on an elastic member of the seat depth adjustment device comprising two strap portions connected to the trim member.

FIG. 6B is a perspective view of an attachment member for clipping each strap portion to a guiding member of the seat depth adjustment device.

FIG. 6C is a front view of a sub-assembly comprising the trim member and the elastic member as well as the attachment members, which may be pre-fabricated and then firstly attached to guiding member of the seat depth adjustment device and later to the first and second cushion members.

FIG. 7 is a perspective view on the adjustment member of the seat depth adjustment device acting on the two strap portions of the elastic member via flange portions provided at an rear edge of the adjustment member.

FIG. 8 shows a cross-sectional view of the adjustment member acting with an integral flange portion on a strap portion of the elastic element for pulling the trim member into the gap.

FIG. 9 is a cross-sectional view of an adjustment member comprising a separate cover element instead of an integral flange portion for acting on the elastic member.

FIGS. 10 to 11 are enlarged cross-sectional views showing alternative designs for a flange portion and a cover element.

DETAILED DESCRIPTION

Figure 12:
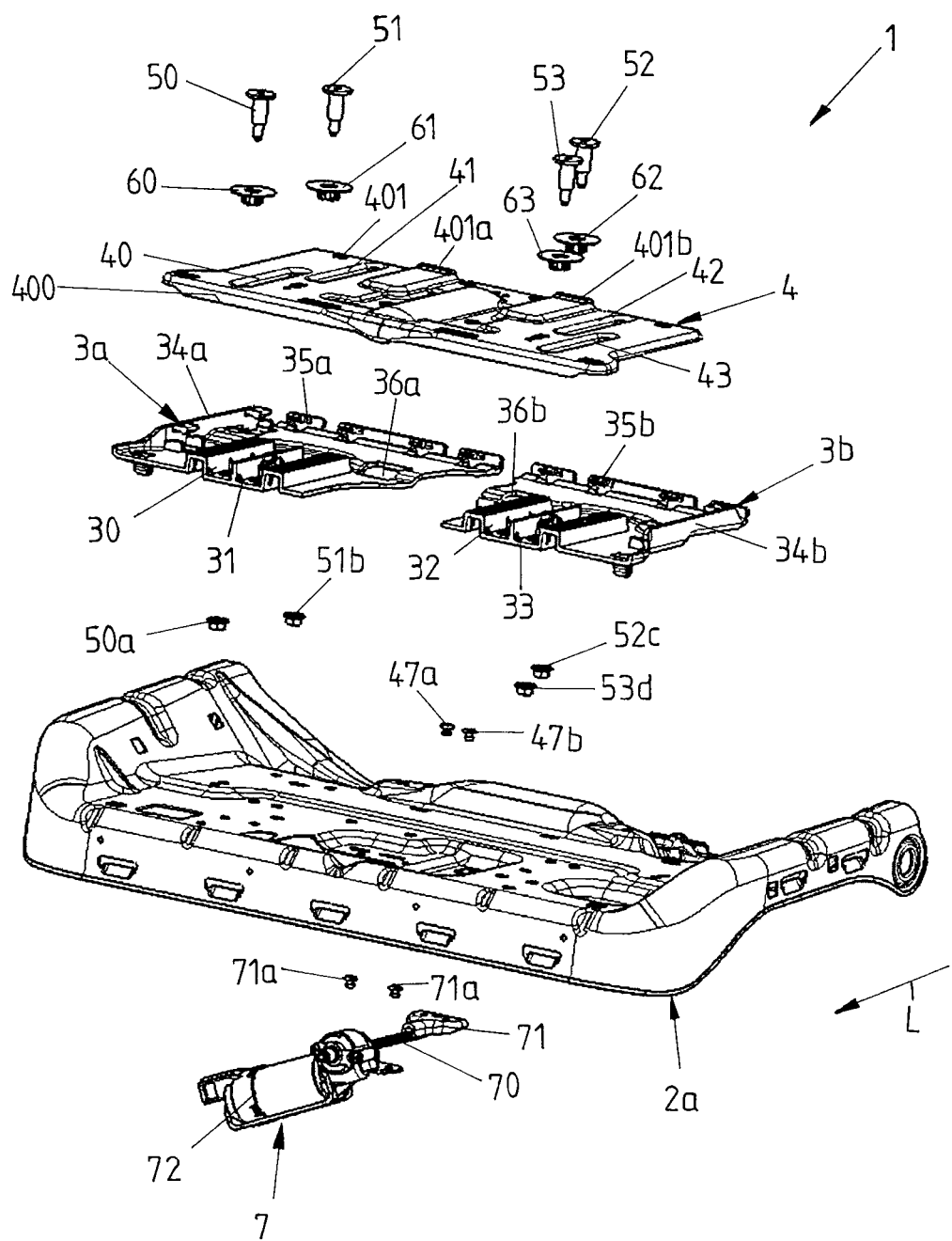
FIG. 12 is an exploded view of the seat depth adjustment device (not showing the elastic member and the trim member).

FIG. 12 shows an exploded view of a seat depth adjustment device 1 for an embodiment of the seat cushion arrangement. The seat depth adjustment device 1 comprises a seat front part in the form of a cushion pan 2a. The cushion pan 2a is it to be mounted to a seat structure 2b of a motor vehicle seat (see for example FIG. 2A). The cushion pan 2a carries two guiding members in the form of two slider plates 3a, 3b. The separate slider plates 3a, 3b are fixed to the cushion pan 2a and integrate first guiding channels 30 to 33 for guiding an adjustable adjustment member in the form of an adjustment plate 4 of the seat adjustment device 1 along a longitudinal adjustment axis L. By adjusting the adjustment plate 4 at the slider plates 3a, 3b a first cushion member C1 fastened to the adjustment plate 4 may be displaced relative to a fixed second cushion member C2. This second cushion member C2 may be fastened to the seat structure 2b and the cushion pan 2a (see for example FIG. 1B).

The adjustment plate 4 is slidably mounted to the two slider plates 3a, 3b, wherein second guiding channels 40 to 43 of the adjustment plate 4 engage associated ones of the first guiding channels 30 to 33 at the slider plates 3a and 3b. Sliding elements in the form of bolts 50 to 53 and corresponding bushings 60 to 63 are provided for each pair of first and second channels 30/40, 31/41, 32/42 and 33/43. Each bolt 50 to 53 reaching through a bushing 60 to 63 as well as through a corresponding pair of the first and second guide channels 30/40, 31/41, 32/42 or 33/43 is fixed to the cushion pan 2a by nuts 50a, 51b, 52c, and 53d. Therefore, each bolt 50 to 53 reaches through a first through hole (bore) at a base of each first guide channel 30 to 33 of a slider plates 3a, 3b as well as an aligned second through hole (bore) in the cushion pan 2a. The two slider plates 3a, 3b are hence fixed by the bolts 50 to 53 and nuts 50a to 53d screwed onto their threaded ends projecting at a bottom side of the cushion pan 2a, while, at the same time, the adjustment plate 4 is slidably held at the slider plates 3a, 3b. The adjustment plate 4 may thus be displaced relative to the two slider plates 3a, 3b by sliding the adjustment plate 4 along the bushings 60 to 63 arranged in the second guide channels 40 to 43 of the adjustment plate 4.

For driving an adjustment of the adjustment plate 4 relative to the slider plates 3a and 3b and thus relative to the cushion pan 2a a drive unit 7 is provided. This drive unit 7 of the seat depth adjustment device 1 comprises an electric drive motor 72 with a gearing. The drive motor 72 drives a spindle 70 of the drive unit 7. The spindle 70 meshes with a spindle nut bracket 71 which is fixed via two rivets 71a to the adjustment plate 4. A housing of the drive unit 7 is fixed to the bottom side of the cushion pan 2a via fixing rivets 47a, 47b. This allows for a compact design of the motor-driven seat depth adjustment device 1 which may be pre-assembled with the cushion pan 2a and then later mounted to the seat structure 2b.

As shown in FIGS. 1A, 1B and 3 the seat depth adjustment device 1 is configured for adjusting the first cushion member C1 at the seat front relative to the fixed second cushion member C2. The first displaceable cushion member C1 is fastened to the adjustment plate 4 and arranged between two side bolsters Ba, Bb. The slider plates 3a and 3b comprise several side bolster attachment elements 34a, 34b for attaching a bolster trim of the side bolsters Ba, Bb. Furthermore, the slider plates 3a and 3b comprise several cushion trim attachment elements 35a, 35b at a rear end portion at which a trim of the fixed second cushion member C2 may be fixed to the slider plates 3a, 3b and thereby to the cushion pan 2a.

Upon movement of the first cushion members C1 to the foremost position as shown in FIG. 1B a gap G between the first and second cushion members C1 and C2 increases. For covering this gap G a trim member 8 of the seat depth adjustment device 1 is provided. This trim member 8 is flexible and for example textile and fixed to both the first and the second cushion members C1 and C2 so that the trim member 8 is stretched when the first cushion member C1 is displaced towards its foremost position. The trim member 8 thus covers the gap G.

For automatically retracting the trim member 8 into the gap G when the first cushion member C1 is adjusted toward its rearmost position by the seat depth adjustment device 1 the seat depth adjustment device 1 further comprises an elastic member 9. The elastic member 9 is configured for pulling the trim member 8 into the gap G upon adjustment of the adjustment plate 4 (and thus the first cushion member C1) towards the rearmost position. The elastic member 9 may apply a tensile force F along a fold 80 of the trim member 8 separating the trim member 8 into two trim portions 8a and 8b of which a first trim portion 8a is connected to the fixed second cushion member C2 and second trim portion 8b is fixed to the adjustable first cushion member C1.

The elastic member 9 comprises to elastic strap portions 9a, 9b being spaced apart from each other in a direction perpendicular to the longitudinal adjustment axis L along which the adjustment plate 4 may be displaced relative to the slider plates 3a, 3b. Each elastic strap portion 9a, 9b is connected to the trim member 8 and one of the slider plates 3a, 3b. For the connection to the respective slider plate 3a or 3b an attachment member in the form of a plastic attachment clip 90a or 90b is provided. Each elastic strap portion 9a, 9b is fixed at a connection part 902 of its corresponding attachment clip 90a, 90b, for example by sewing or bonding. Each elastic strap portion 9a, 9b thus extends from an attachment clip 90a or 90b to an end section attached to the trim member 8 in the area of the fold 80.

Each attachment clip 90a, 90b comprises an engagement part/clip portion 900 for clipping the attachment clip 90a or 90b to one of the slider plates 3a, 3b. For this purpose each slider plate 3a, 3b comprises a connection opening 36a or 36b through which an attachment clip 90a or 90b reaches for engaging around a bordering edge section 360 of the respective connection opening 36a, 36b, as for example shown in FIGS. 2A to 2B and 4A to 4B. A looking catch portion is provided at each attachment clip 90a, 90b which may engage behind a small projection protruding at a bottom side of each slider plate 3a, 3b near the edge section 360. Each attachment clip 90a, 90b may thus snapped onto an edge section 360 thereby locking the attachment clip 90a, 90b in place without requiring any additional tools when the attachment clip 90a, 90b is duly mounted to the edge section 360. The strap portions 9a, 9b made us be easily mounted to the slider plates 3a, 3b by clipping.

The strap portions 9a, 9b extending from the slider plates 3a, 3b to the trim member 8 within the gap G may apply a tensile force F on the trim member 8 to pull the trim member 8 into the gap G when the adjustment plate 4 is moved towards its rearmost position. For this purpose, the adjustment plate 4 comprising a front edge 400 and a rear edge 401, in the embodiment of FIGS. 1A to 7, integrates two flange portions 401a, 401b at the rear edge 401. Each flange portion 401a, 401b comprise a convex portion at the rear end of the adjustment plate 4. Whereas the flange portions 401a, 401b are spaced apart from an associated elastic strap portion 9a or 9b when the adjustment plate 4 is located in its foremost position, thus allowing the trim member 8 to be fully expanded and covering the gap G, each flange portion 401a, 401b acts on an associated elastic strap portion 9a, 9b of the elastic member 9 when the adjustment plate 4 is moved towards its rearmost position. At each flange portion 401a, 401b the associated elastic strap portion 9a or 9b is then deflected thereby tensioning the elastic strap portion 9a or 9b. The more the adjustment plate 4 is moved towards its rearmost position the more the elastic strap portions 9a and 9b are bent at the associated flange portions 401a, 401b resulting in a greater tensile force F on the trim member 8 which contracts the flexible, textile (fabric) trim member 8 and retracts the trim member 8 into the gap G. The trim member 8 is thus automatically contracted and retracted into the gap G upon adjustment of the adjustment plate 4 (and thus the first cushion member C1) towards its rearmost position.

As shown in FIGS. 4A, 4B and 5 the two elastic strap portions 9a, 9b of the elastic member 9 at least partially extend underneath the adjustment plate 4 when the adjustment plate 4 is located in its rearmost position. The connection openings 36a, 36b in the slider plates 3A, 3B into which the plastic attachment clips 90a, 90b reach are completely covered by the adjustment plate 4 in the rearmost position of the adjustment plate 4. Furthermore, the attachment clips 90a, 90b for fixing the elastic strap portions 9a and 9b to the slider plates 3a and 3b, respectively, are arranged on both sides of the spindle nut bracket 71 fixed to the adjustment plate 4. The arrangement of the elastic member 9 thus allows for a compact design. Furthermore, a fast assembly of the seat depth adjustment device 1 is possible by just clipping the attachment clips 9a, 9b onto an (opening) edge section 360 of the respective connection opening 36a, 36b which edge section 360 in each case lies towards the direction along which the adjustment plate 4 is adjusted from the rearmost position to the foremost position.

As can for example be seen from FIGS. 6A to 6C, the two elastic strap portions 9a, 9b in each case extend from a first end section 9.2 fixed to the corresponding attachment clip 90a or 90b to a second end section 9.1 attached to the trim member 8 at the fold 80. Whereas each first end section 9.2 is of rectangular design and has a width essentially corresponding to a width of the collection part 902 of its attachment clip 90a or 90b, the second end section 9.1 is of greater width and has a triangular contour. The width of each elastic strap portion 9a, 9b of the elastic member 9 thus increases along a direction of extension from a first end section 9.2 fixed to the corresponding attachment clip 90a or 90b towards the second end section 9.1 attached to the trim member 8. This design of the elastic member 9 with the two elastic strap portions 9a, 9b allows for a uniform distribution of the tensile force F along the fold 80 of the trim member 8 and hence a smoothly retraction of the trim member 8 into the gap G when the adjustment plate 4 is moved towards its rearmost position. Although just two elastic strap portions 9a and 9b and two associated flange portions 401a, 401b configured for acting on those strap portions 9a, 9b are provided the elongated flexible, textile trim member 8 may be smoothly contracted by the elastic member 9 upon the movement of the adjustment plate 4.

FIG. 7 shows the adjustment plate 4 with its integral flange portions 401a and 401b acting on the two elastic strap portions 9a and 9b of the elastic member 9 thereby contracting the trim member 8.

In the sectional view of FIG. 8 the action of the adjustment plate 4 via their curved, in particular convex flange portions 401a, 401b on the strap portions 9a and 9b is shown in greater detail. The curved rearward flange portions 401a, 401b provide for a soft edge at which an associated strap portion 9a or 9b may be smoothly bent in order to apply the tensile force F on the trim member 8.

Instead of integrally formed flange portions 401a, 401b for acting on the strap portions 9a and 9b an alternative embodiment shown in the sectional view of FIG. 9 may comprise at least one cover element 402 for acting on a single strap portion 9a or 9b or for acting on both strap portions 9a and 9b. The cover element 402 is U-shaped in cross-section and plugged as a separate component on rear edge 401 of the adjustment plate 4.

In FIGS. 10 and 11 further alternative design options for an integrally formed flange portion 401a, 401b at the rear end of the adjustment plate 4 (FIG. 10) and for differently shaped and differently dimensioned cover elements 403 and 404 (FIG. 11) are shown. For example, an integral flange portion 401a or 401b for acting on an elastic strap portion 9a and/or 9b may also be bent upwards (towards the trim member 8). For varying a force applied by the adjustment member 4 moving toward its rearmost position a cover element 402 may also project significantly over the rear edged 401 of the adjustment plate 4 in order to apply a greater force F on the elastic member 9. Additionally or in the alternative, a cover element 404 may also comprise a portion which projects upwards with respect to the adjustment plate 4 towards the trim member 8.

Generally, a cover element 402, 403 or 404 may be a separate component made of plastic or a metal. A cover element 402, 403 or 404 may be plugged on the rear edge 401 of the adjustment plate 4 (which rear edge lies in a direction from the foremost position to the rearmost position). A cover element 402, 403 or 404 may, however, also be molded or bonded to the adjustment plate 4. Generally, the elastic member 9 and in particular its strap portions 9a and 9b may also be made of a hyperelastic material.

What is claimed is:

1. A seat cushion arrangement comprising:
    a first cushion member;
    a second cushion member being adjustable relative to the first cushion member; and
    a seat depth adjustment device for adjusting the second cushion member relative to the first cushion member along a longitudinal adjustment axis,
    wherein the seat depth adjustment device comprises:
    a seat front part;
    a guiding member at the seat front part;
    an adjustment member to which the second cushion member is fastened and which is adjustable between a foremost position and a rearmost position relative to the guiding member for adjusting the second cushion member relative to the first cushion member;
    a trim member connected to both the first and second cushion members, which trim member covers a gap between the first and second cushion members at least in the foremost position of the adjustment member and is at least partially retracted into the gap in the rearmost position of the adjustment member; and
    an elastic member (a) connected to the trim member and to at least one of the guiding member and the seat front part and (b) configured to pull the trim member into the gap upon adjustment of the adjustment member from the foremost position towards the rearmost position,
    wherein the elastic member comprises at least one end section fixed to an attachment member engaging an edge section of least one of the guiding member and the seat front part thereby connecting the elastic member to at least one of the guiding member and the seat front part, and
    wherein the attachment member comprises an engagement part clipped to the edge section, the attachment member comprising a locking catch portion engaging behind a projection at the edge section.

2. The seat cushion arrangement of claim 1, wherein the edge section borders an opening into which the attachment member reaches.

3. The seat cushion arrangement of claim 2, wherein the attachment member engages an edge section of the guiding member bordering an opening in the guiding member.

4. The seat cushion arrangement of claim 3, wherein the opening in the guiding member is completely covered by the adjustment member in the rearmost position of the adjustment member.

5. The seat cushion arrangement of claim 1, wherein the end section of the elastic member is sewed or bonded to the attachment member.

6. The seat cushion arrangement of claim 1, wherein the adjustment member is adjustable from the rearmost position to the foremost position in a first direction along the longitudinal adjustment axis and from the foremost position to the rearmost position in a second direction opposite the first direction, and wherein the edge section that the attachment member engages extends along the first direction.

7. The seat cushion arrangement of claim 1, wherein the elastic member comprises at least one strap portion which comprises the end section fixed to the attachment member and another end section connected to the trim member, wherein a width of at least one section of the at least one strap portion increases along a direction of extension of the strap portion pointing from the end section fixed to the attachment member towards the other end section connected to the trim member.

8. The seat cushion arrangement of claim 7, wherein the at least one section of increasing width has a constant thickness.

9. The seat cushion arrangement of claim 7, wherein the at least one strap portion comprises an end section fixed to the attachment member having a rectangular contour and an end section of greater width which is connected to the trim member and has a triangular contour.

10. The seat cushion arrangement of claim 1, wherein the elastic member comprises at least two strap portions being spaced apart from each other in a direction perpendicular to the longitudinal adjustment axis.

11. A seat cushion arrangement comprising:
a first cushion member;
a second cushion member being adjustable relative to the first cushion member; and
a seat depth adjustment device for adjusting the second cushion member relative to the first cushion member along a longitudinal adjustment axis,
wherein the seat depth adjustment device comprises:
a seat front;
a guiding member at the seat front part;
an adjustment member to which the second cushion member is fastened and which is adjustable between a foremost position and a rearmost position relative to the guiding member for adjusting the second cushion member relative to the first cushion member;
a trim member connected to both the first and second cushion members, which trim member covers a gap between the first and second cushion members at least in the foremost position of the adjustment member and is at least partially retracted into the gap in the rearmost position of the adjustment member; and
an elastic member (a) connected to the trim member and to at least one of the guiding member and the seat front part and (b) configured to pull the trim member into the gap upon adjustment of the adjustment member from the foremost position towards the rearmost position,
wherein the elastic member comprises at least one end section fixed to an attachment member engaging an edge section of least one of the guiding member and the seat front part thereby connecting the elastic member to at least one of the guiding member and the seat front part, and
wherein at least one of a flange portion and a cover element is provided which is configured to act on the elastic member upon adjustment of the adjustment member from the foremost position towards the rearmost position for tensioning the elastic member and thereby pulling the trim member into the gap.

12. The seat cushion arrangement of claim 11, wherein the elastic member is deflected at at least one of the flange portion and the cover element at least in the rearmost position of the adjustment member.

13. The seat cushion arrangement of claim 11, wherein the flange portion is an integral part of the adjustment member.

14. The seat cushion arrangement of claim 11, wherein the cover element is a separate component coupled to a rear edge section of the adjustment member.

15. The seat cushion arrangement of claim 11, wherein the elastic member comprises at least one elongated strap portion and at least one of the flange portion and the cover element is configured to act on the at least one strap portion of the elastic member upon adjustment of the adjustment member from the foremost position towards the rearmost position.

16. The seat cushion arrangement of claim 13, wherein the at least one strap portion comprises the end section fixed to the attachment member.

17. The seat cushion arrangement of claim 11, wherein the elastic member comprises at least one strap portion which comprises the end section fixed to the attachment member and another end section connected to the trim member, wherein a width of at least one section of the at least one strap portion increases along a direction of extension of the strap portion pointing from the end section fixed to the attachment member towards the other end section connected to the trim member.

18. The seat cushion arrangement of claim 11, wherein the elastic member comprises at least two strap portions being spaced apart from each other in a direction perpendicular to the longitudinal adjustment axis.

19. A seat cushion arrangement comprising:
a first cushion member;
a second cushion member being adjustable relative to the first cushion member; and
a seat depth adjustment device for adjusting the second cushion member relative to the first cushion member along a longitudinal adjustment axis,
wherein the seat depth adjustment device comprises:
a seat front part;
a guiding member at the seat front part;
an adjustment member to which the second cushion member is fastened and which is adjustable between a foremost position and a rearmost position relative to the guiding member for adjusting the second cushion member relative to the first cushion member;
a trim member connected to both the first and second cushion members, which trim member covers a gap between the first and second cushion members at least in the foremost position of the adjustment member and is at least partially retracted into the gap in the rearmost position of the adjustment member; and
an elastic member (a) connected to the trim member and to at least one of the guiding member and the seat front part and (b) configured to pull the trim member into the gap upon adjustment of the adjustment member from the foremost position towards the rearmost position,
wherein the elastic member comprises at least one strap portion comprising a first end section via which the elastic member is connected to at least one of the guiding member and the seat front part and a second end section via which the elastic member is connected to the trim member, wherein the at least one strap portion extends along a direction of extension from the first end section towards the second end section and a width of at least one section of the at least one strap portion increases along the direction of extension.

20. The seat cushion arrangement of claim 19, wherein the elastic member comprises at least two strap portions being spaced apart from each other in a direction perpendicular to the longitudinal adjustment axis.

\* \* \* \* \*